United States Patent

[11] 3,578,028

[72] Inventor Robert E. Roberts
       Wilton, Conn.
[21] Appl. No. 842,122
[22] Filed July 16, 1969
[45] Patented May 11, 1971
[73] Assignee Fred T. Roberts & Company
       Wilton, Conn.

[54] REINFORCED HOSE AND METHOD OF MAKING THE SAME
8 Claims, 8 Drawing Figs.

[52] U.S. Cl. ................................................. 138/123,
                                                   138/134, 66/195
[51] Int. Cl. ................................................. F16l 11/08
[50] Field of Search ........................................... 138/123,
                                                122, 134; 66/9 (A), 195

[56] References Cited
UNITED STATES PATENTS
1,201,803  10/1916  Chace ......................... 66/195
1,669,051  5/1928   Gratz .......................... 138/123X
1,814,224  7/1931   Murphy ....................... 138/123X
3,083,736  4/1963   Roberts ....................... 138/122
3,115,898  12/1963  Rathermel .................... 138/122
3,299,674  1/1967   Scheihe ....................... 66/195
3,349,806  10/1967  Roberts ....................... 138/122

Primary Examiner—Herbert F. Ross
Attorney—Johnson & Kline

ABSTRACT: A tubular flexible hose of elastomeric material and the method of making the same, said hose having a reinforcing layer of warp knit net fabric. It can have a helical spring wire under the fabric. The hose is highly resistant to bursting under internal pressure, and has substantially no axial extension and only slight radial stretch and can be readily manufactured.

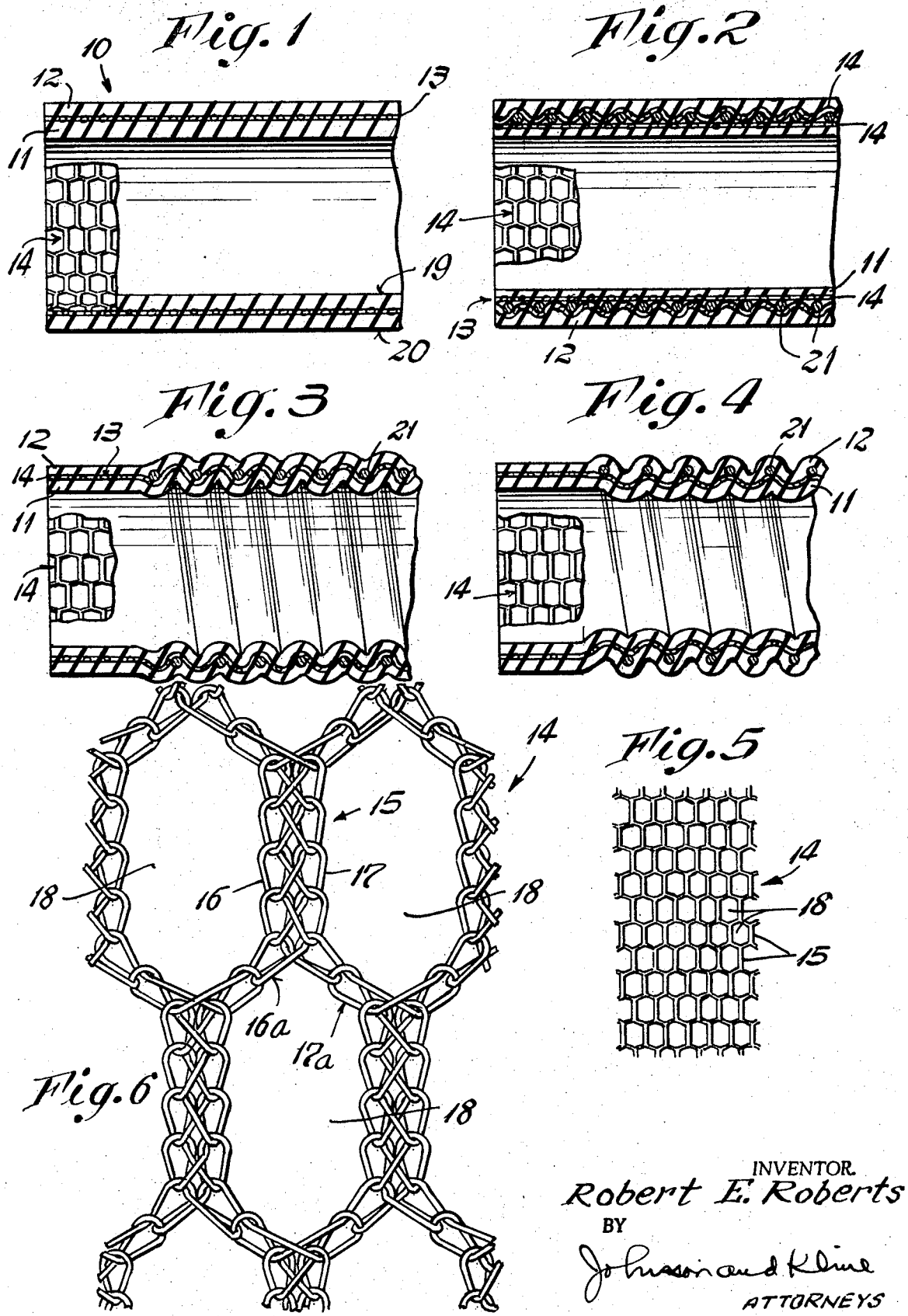

INVENTOR.
Robert E. Roberts
BY
Johnson and Kline
ATTORNEYS

REINFORCED HOSE AND METHOD OF MAKING THE SAME

Heretofore hose has been made with a fabric reinforcement but these hose have had the disadvantages of being too stiff, of having undesired elongation and radial expansion, or having a relatively low bursting point under internal pressure.

The present invention overcomes these disadvantages by providing a hose which is readily manufactured and has substantially no axial elongation, slight radial expansion and high resistance to bursting under internal pressure.

This is achieved by providing a reinforcing layer in the hose including a warp knit net fabric which may be associated with a helical spring. The warp knit net fabric has a plurality of pillars, each consisting of at least two wales of interlocked stitches. The pillars extend in spaced relation in rows circumferentially of the hose and are offset in the rows with the ends of the pillars in one row connected by stitches to the adjacent ends of the pillars in the next row.

The hose can have a smooth bore and exterior surface or can be corrugated as required and can be readily produced by a simple method to provide a strong hose capable of withstanding high internal pressures without bursting, having no substantial axial stretch under normal conditions, and but a slight radial stretch.

Other features and advantages of the invention will be apparent from the specification and claims when considered in connection with the accompanying drawings in which:

FIG. 1 shows a short length of hose, partly in section, showing one form of the invention.

FIG. 2 is a view similar to FIG. 1 showing another form of the invention.

FIG. 3 is a view similar to FIG. 1 showing a further form of the invention.

FIG. 4 is a view similar to FIG. 1 showing a still further form of the invention.

FIG. 5 is a section of warp knit net fabric.

FIG. 6 is an enlarged section of the fabric of FIG. 5.

Figure 8:
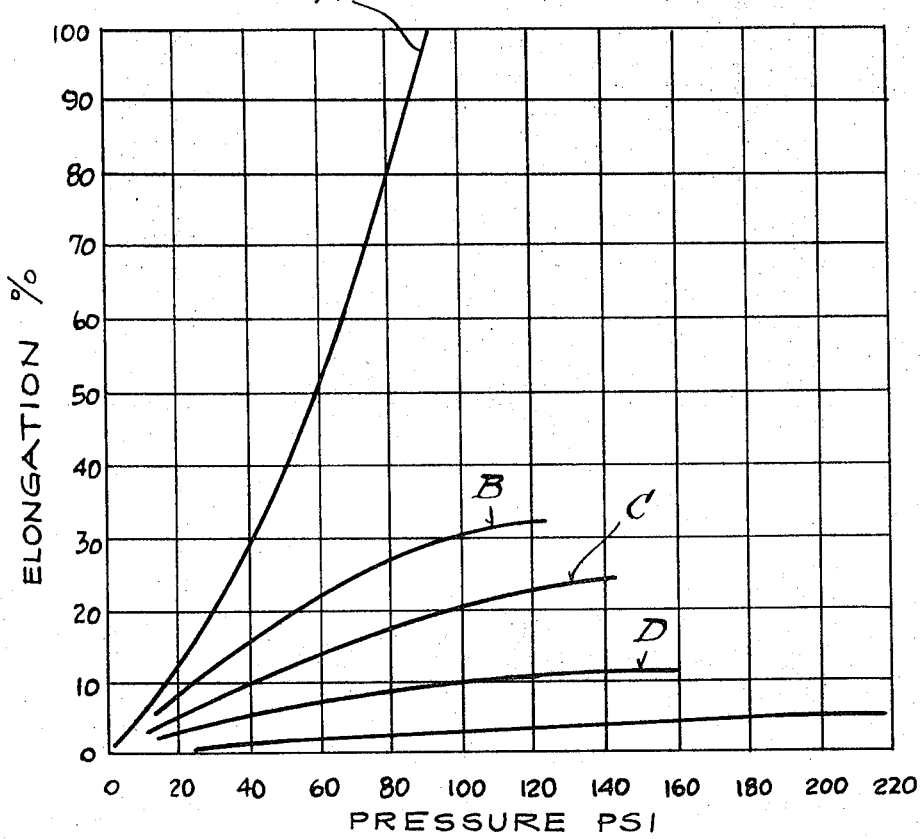
FIG. 8 is a comparison chart.

As shown in the drawings, a tubular flexible hose of the present invention comprises an inner layer of a suitable elastomeric material, a reinforcing layer including a warp knit net fabric and an outer cover or layer of suitable elastomeric material, all molded into a unitary construction.

In the form of the invention shown in FIG. 1, the hose 10 comprises an inner layer 11 and an outer or cover layer 12 having a reinforcing layer 13 embedded therebetween. The reinforcing layer comprises a warp knit net fabric 14 such as shown in FIGS. 5 and 6 having a plurality of pillars 15 each formed by a parallel row of interconnected stitches 16, 17 (FIG. 6). As shown in FIG. 5, the pillars are disposed in spaced relation in parallel rows with the pillars offset in said rows. The adjacent ends of the pillars are connected by angularly disposed single connecting stitches 16a, 17a forming a diagonally arranged series of openings 18.

The fabric, which may be dipped in a latex or cement solution or calendered with rubber to facilitate its incorporation into the unitary structure, is arranged in the hose with the pillars extending circumferentially as shown in FIG. 10. The reinforcing layer is embedded in the hose with the material of the inner and outer layers being joined through the openings to form a unitary structure having a smooth bore 19 and exterior surface 20.

The hose is made by positioning an inner layer 11 of suitable elastomeric material over a usual smooth mandrel (not shown). The warp knit net fabric 14 is laid over the inner layer with the pillars extending circumferentially and an outer or cover layer 12 of suitable elastomeric material is disposed over the reinforcing layer. The whole is wet wrapped or inserted into a usual cylindrical cavity in a mold (not shown) and subjected to suitable heat and pressure to form it into a unitary structure having a smooth bore and outer surface.

The flexible hose thus formed is particularly adapted for use in automobile cooling systems which operate at between 15—20 p.s.i., has high resistance to bursting under internal pressure, has slight radial expansion and substantially no longitudinal stretch in normal operation.

The form of the invention shown in FIG. 2 is similar to that shown in FIG. 1 with the exception that the reinforcing layer comprises a layer of warp knit net fabric 14 disposed over the inner layer 11, a helical spring 21 is disposed thereover and a second layer 14 of warp knit net fabric is positioned over the spring and the outer layer or cover 12 is put in place. This assembly is molded in the same manner as described in FIG. 1 to provide a smooth bore and outer surface.

Figure 7:
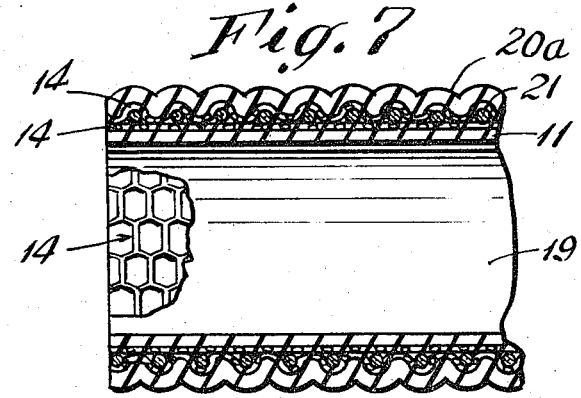
FIG. 7 is another form of the invention of FIG. 2.

In the form of the invention shown in FIG. 7, the hose has the same construction of elements as shown in FIG. 2 and it is wet wrapped to form a smooth bore 19 and a corrugated outer surface 20a.

In the form of the invention shown in FIG. 3, the hose has an inner layer 11, an outer layer 12 and a reinforcement layer 13 therebetween. The reinforcement layer comprises a layer 14 of warp knit net fabric and a helical spring positioned thereover. The hose is then molded in a helically corrugated mold to provide helical corrugations on the outer surface and in the bore with the helical spring positioned in the troughs of the outer corrugations. In carrying out the method of making this hose the inner layer 11 is laid on an expansible mandrel (not shown), the net fabric 14 is laid over the inner layer, the helical spring 21 is positioned over the net fabric and the outer layer 12 is put in position. The unit is placed in the corrugated cylindrical cavity in a mold (not shown) and internal pressure causes the hose to assume the shape shown in FIG. 3.

The form of the invention shown in FIG. 4 is similar to that shown in FIG. 3 with the exception that the wire coils are positioned so as to lie in the crests of the corrugations when the hose is molded to provide a corrugated inner and outer surface.

A comparison of hose made in accordance with the present invention with other hose constructions now in use was made and the results are shown in the chart in FIG. 8. The curve marked A is a curve produced by an all rubber hose on a chart of elongation percentage against internal pressure (p.s.i.). The curve shows that the all rubber hose had an elongation of 100 percent and a bursting pressure of 90 p.s.i. Curve B represents a hose made with a knit layer under a spring and covered with rubber. The chart shows that this had an elongation of 32 percent and a bursting pressure of 125 p.s.i. Curve C represents a hose made with a bias cut square woven fabric over a helical spring and enclosed in rubber. It has a 24 percent elongation with a bursting pressure of 140 p.s.i. Curve D represents a hose having parallel longitudinal strands embedded in a rubber body and it showed an elongation of 12 percent and a bursting pressure of 160 p.s.i. Curve E represents a hose of the present invention having one ply of warp knit net fabric disposed under a spring enclosed with rubber and it had an elongation of 6 percent at a bursting pressure of 220 p.s.i. It will be noted that in the normal range of between 15—20 p.s.i. as encountered in an automobile cooling system there is substantially no elongation of the hose as indicated in curve E whereas the other hose showed 2½ percent to 12 percent elongation at 20 p.s.i.

Thus it will be seen that the present hose is a substantial advantage insofar as elongation is concerned. With respect to the radial stretching, it has a very slight radial stretch due to the weave of the net fabric and the action of the circumferentially disposed pillars.

Variations and modifications may be made with the scope of the invention and portions of the improvements may be used without others.

I claim:

1. A tubular, flexible hose comprising a body of elastomeric material having embedded therein a reinforcing layer comprising a warp knit net fabric having rows of spaced, circumferentially aligned pillars with the pillars of one row offset from the pillars in the adjacent rows and the ends of the pillars in adjacent rows being connected by stitches and forming diagonally arranged series of openings, said hose having high resistance to bursting under internal pressure, substantially no axial stretch, and slight radial stretch.

2. The invention as defined in claim 1 wherein the hose has a smooth internal bore and a smooth external surface.

3. The invention as defined in claim 1 wherein the hose has a helically corrugated internal bore and external surface.

4. The invention as defined in claim 1 wherein the reinforcing layer has a spiral spring disposed between layers of warp knit net fabric.

5. The invention as defined in claim 4 wherein the hose has a smooth internal bore and external surface.

6. The invention as defined in claim 4 wherein the hose has a smooth internal bore and corrugated external surface with the spring wires disposed in the crests of the corrugations.

7. The invention as defined in claim 3 wherein the reinforcing layer has a helical spring over the warp knit net fabric with the spring located in the troughs of the corrugations.

8. The invention as defined in claim 3 wherein the reinforcing layer has a helical spring over the warp knit net fabric with the spring located in the crests of the corrugations.